United States Patent
Bell et al.

(10) Patent No.: US 9,752,299 B2
(45) Date of Patent: Sep. 5, 2017

(54) SYSTEM HAVING PITCH-ADJUSTED ROTATIONAL SPEED MEASUREMENT

(71) Applicant: Caterpillar Inc., Peoria, IL (US)

(72) Inventors: Jason D. Bell, Dahinda, IL (US); Gerard O. McCann, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 60 days.

(21) Appl. No.: 14/700,959

(22) Filed: Apr. 30, 2015

(65) Prior Publication Data
US 2016/0319510 A1 Nov. 3, 2016

(51) Int. Cl.
| | | |
|---|---|---|
| *E02F 3/65* | (2006.01) | |
| *G01P 3/44* | (2006.01) | |
| *G01P 1/02* | (2006.01) | |
| *E02F 3/64* | (2006.01) | |
| *E02F 9/26* | (2006.01) | |

(52) U.S. Cl.
CPC ............ *E02F 3/651* (2013.01); *E02F 3/6454* (2013.01); *E02F 9/264* (2013.01); *G01P 1/026* (2013.01); *G01P 3/44* (2013.01)

(58) Field of Classification Search
CPC ............ B60T 2250/04; B60T 2250/00; B60T 2240/00; B60T 8/172; B60T 2210/36; E02F 3/845; E02F 3/651; E02F 3/6454; E02F 9/264; B60W 2520/16; G01P 3/44; G01P 1/026
See application file for complete search history.

(56) References Cited

U.S. PATENT DOCUMENTS

| | | | |
|---|---|---|---|
| 3,703,999 A | | 11/1972 | Forys et al. |
| 4,431,060 A | * | 2/1984 | Scholl ................ E02F 3/845 172/4.5 |
| 4,630,685 A | * | 12/1986 | Huck, Jr. ............ E02F 3/845 172/2 |
| 5,699,248 A | * | 12/1997 | Nakagami ............ E02F 3/844 172/2 |
| 5,860,480 A | * | 1/1999 | Jayaraman ............ E02F 3/845 172/2 |
| 6,035,249 A | | 3/2000 | Yamamoto et al. |
| RE37,218 E | | 6/2001 | Densmore et al. |
| 6,338,152 B1 | | 1/2002 | Fera et al. |
| 6,845,311 B1 | * | 1/2005 | Stratton ................ E02F 3/847 340/870.16 |
| 7,590,481 B2 | * | 9/2009 | Lu ........................ B60T 8/172 340/440 |

(Continued)

*Primary Examiner* — Jamie L McGowan
(74) *Attorney, Agent, or Firm* — Finnegan, Henderson, Farabow, Garrett & Dunner, LLP

(57) ABSTRACT

A speed measurement system for use with a machine having a component rotationally mounted inside a housing may have a first sensing element configured to be mounted to the housing adjacent the component, and a second sensing element configured to be mounted to the housing. The first sensing element may be configured to generate a first signal indicative of a rotational velocity of the component. The second sensing element may be configured to generate a second signal indicative of a rotational rate of the housing. The speed measurement system may also have a controller in communication with the first and second sensing elements. The controller may be configured to determine a rotational speed of the component relative to an offboard reference based on the first and second signals.

18 Claims, 2 Drawing Sheets

(56) References Cited

U.S. PATENT DOCUMENTS

| | | | |
|---|---|---|---|
| 8,442,720 B2 | 5/2013 | Lu et al. | |
| 8,600,621 B2 | 12/2013 | Callaway et al. | |
| 8,768,558 B2 | 7/2014 | Reeve et al. | |
| 8,855,869 B2 | 10/2014 | Shockency, Jr. et al. | |
| 9,043,113 B2 * | 5/2015 | Padilla | E02F 3/842 172/2 |
| 9,221,340 B2 * | 12/2015 | Byers | B60K 28/16 |
| 2006/0202554 A1 * | 9/2006 | Hernette | B60T 7/107 303/191 |
| 2011/0035093 A1 * | 2/2011 | Moench | G01P 3/366 701/31.4 |
| 2012/0158209 A1 * | 6/2012 | Doy | B60T 8/172 701/1 |
| 2013/0079988 A1 * | 3/2013 | Hirao | B60W 10/22 701/38 |
| 2014/0316657 A1 * | 10/2014 | Johnson | B63H 25/06 701/42 |
| 2014/0324300 A1 | 10/2014 | Halder et al. | |

* cited by examiner

SYSTEM HAVING PITCH-ADJUSTED ROTATIONAL SPEED MEASUREMENT

TECHNICAL FIELD

The present disclosure relates to a speed measurement system and, more particularly, to a system having pitch-rate adjusted rotational speed measurement.

BACKGROUND

Accurate speed measurement can be important for mobile machines. For example, speed measurement can be used as input for traction control systems, guidance systems, braking systems, navigation systems, and many other machine systems. If a detected speed is not accurate, performance and/or stability of the related system could be negatively affected.

Many different types of sensors can be used for speed measurement purposes. For example, an onboard navigation receiver may interface with a local laser or global satellite transmitter and determine a change in position of the machine within a prescribed period of time based on a received signal, the change in position then being used together with the period of time to calculate travel speed. A Doppler sensor may use radio waves to detect distance changes from a receiver onboard the machine to objects in an environment surrounding the machine, the distance changes then being used together with an elapsed period of time to calculate a travel speed. Cameras may similarly be used to detect changes in size and or location of images of objects in the machines environment and thereby calculate the travel speed. Magnetic and/or optical sensors may be used to detect a rotational speed of a machine component (e.g., an axle, a gear, or a wheel), the rotational speed then being used along with known kinematics of the machine to calculate the travel speed. Other ways of detecting a machine speed may also be possible.

One problem associated with each of the sensors described above, and other sensors known in the art, involves angular acceleration (e.g., pitching) of the mobile machine in a direction aligned with rotation being measured. For example, during travel of a machine, the part of the machine on which the speed measurement sensor is mounted could pitch forward or backward. When this happens, the speed measurement sensor does not recognize that the machine is pitching, and will erroneously include the pitch rate as a change in speed of the machine component (e.g., the wheel). For example, when pitching forward, the speed measurement sensor will artificially deflate the travel speed of the machine because of the pitching. Likewise, when pitching rearward, the speed measurement sensor will unknowingly inflate the speed of the machine component. When other machine systems use these deflated or inflated speed values, the machine may react in unpredictable and/or undesired ways.

One attempt to improve machine control is disclosed in U.S. Pat. No. 8,600,621 of Callaway et al. that issued on Dec. 3, 2013 ("the '621 patent"). Specifically, the '621 patent discloses a traction control system for a mobile machine. The system includes a first sensor that indicates a speed of a wheel of the machine, a second sensor that indicates an acceleration of the machine, and a third sensor that indicates a pitch rate of the machine. The first sensor is a magnetic sensor located on a hydraulic motor used to drive the wheel. The second sensor is a 3-axis accelerometer. The third sensor is a gyroscope. A controller determines a drive acceleration by differentiating a signal from the first sensor, and determines a ground acceleration based on a signal from the second sensor. The controller adjusts the ground acceleration based on differentiation of a signal from the third sensor to account for machine pitching. The controller then selectively activates a traction control algorithm based on a difference between the drive acceleration and the adjusted ground acceleration.

While the system of the '621 patent may be helpful in many applications to control wheel slip, it may still be less than optimal in other applications. For example, the controller may not be able to determine if the speed signal from the first sensor is accurate. That is, the speed sensor could be producing an erroneous speed signal due to pitching of the machine (and the speed sensor itself), and the controller of the '621 patent could be unaware of the situation.

The present disclosure is directed to overcoming one or more of the problems set forth above and/or other problems of the prior art.

SUMMARY

In one aspect, the present disclosure is directed to a speed measurement system for a machine having a component rotationally mounted within a housing. The speed measurement system may include a first sensing element configured to be mounted to the housing adjacent the component, and a second sensing element configured to be mounted to the housing. The first sensing element may be configured to generate a first signal indicative of a rotational velocity of the component. The second sensing element may be configured to generate a second signal indicative of a rotational rate of the housing. The speed measurement system may also include a controller in communication with the first and second sensing elements. The controller may be configured to determine a rotational speed of the component relative to an offboard reference based on the first and second signals.

In another aspect, the present disclosure is directed to a method of determining a rotational speed of a component rotationally mounted in a housing of a machine. The method may include sensing a rotational velocity of the component relative to the housing, and sensing a rotational rate of the housing. The method may also include determining the rotational speed of the component relative to an offboard reference based on the rotational velocity and the rotational rate.

In yet another aspect, the present disclosure is directed to a scraper. The scraper may include a bowl, a cushion hitch connected at a trailing end to the bowl, and a tractor connected to the cushion hitch at a leading end. The tractor may have a frame, a shaft, a wheel connected to the shaft, and an axle housing supporting the frame and at least partially enclosing the shaft. The scraper may also include a speed sensor mounted to the axle housing and configured to generate a velocity signal indicative of a rotational speed of the shaft, and a rotational rate gyro mounted to the frame and configured to generate a pitch rate signal indicative of pitching of the tractor about the shaft. The scraper may further include a controller in communication with the speed sensor and the rotational rate gyro. The controller may be configured to determine a rotational speed of the wheel relative to a ground surface below the scraper based on the velocity and pitch rate signals.

DETAILED DESCRIPTION

Figure 1:
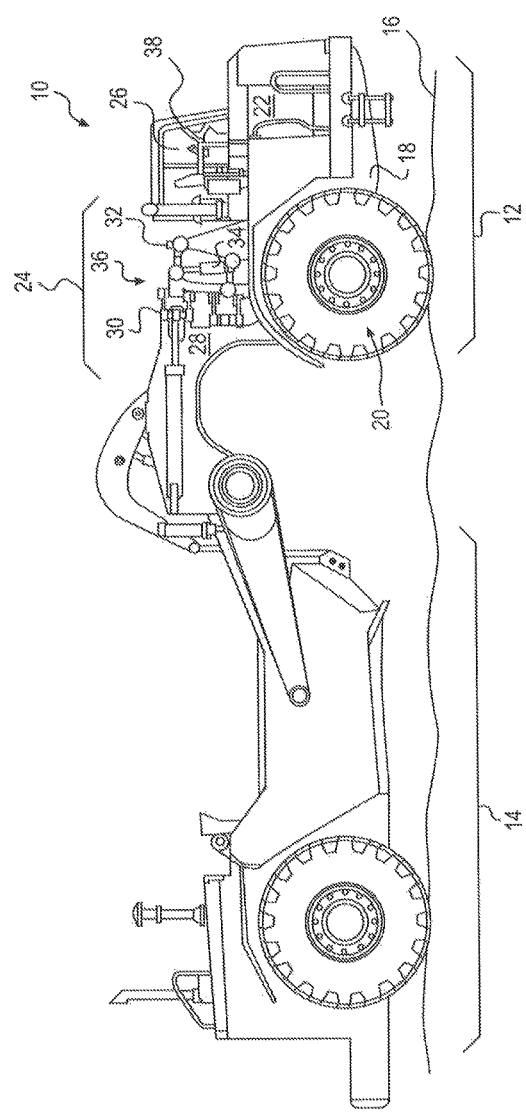
FIG. 1 is an isometric illustration of an exemplary disclosed machine.

FIG. 1 illustrates an exemplary earth-moving machine 10. In this example, machine 10 is a wheeled-tractor-scraper configured to load material at a first location, transport the material from the first location to a second location, and unload the material at the second location. Although commonly referred to as a "wheeled" type of tractor-scraper, it is contemplated that machine 10 may be propelled by way of wheels, continuous tracks, and/or belts. Machine 10 may include a tractor 12 operatively connected to a bowl 14 and configured to tow bowl 14 across a ground surface 16. It is appreciated that machine 10 could be another type of machine, if desired.

Tractor 12 may include multiple components that interact to power and control operations of bowl 14. Specifically, tractor 12 may include a frame 18, a front axle assembly 20, a power source 22, an articulated hitch assembly 24, and an operator station 26. Frame 18 may be supported by front axle assembly 20 and configured to house power source 22. Power source 22 may include, for example, a combustion engine that drives front axle assembly 20 and/or provides electrical and hydraulic power to bowl 14. Articulated hitch assembly 24 may connect tractor 12 to bowl 14, while allowing some relative movement between tractor 12 and bowl 14 in vertical and/or horizontal directions. Operator station 26 may facilitate operator control of tractor 12 and bowl 14.

Articulated hitch assembly 24 may include a curved main beam 28 connected through at least one hinge joint (e.g., a vertical hinge joint 30 and a horizontal hinge joint 32) to frame 18 such that beam 28 may pivot in a horizontal direction and/or in a vertical direction relative to frame 18. In an exemplary embodiment, a cushion actuator 34, such as a hydraulic cylinder, is associated with horizontal hinge joint 32 to provide for selective isolation of operator station 26 from vertical movements of bowl 14. Cushion actuator 34, together with horizontal hinge joint 32, may form what is known as a cushion hitch 36. Cushion hitch 36 may be hydraulically locked during some modes of operations such that beam 28 is inhibited from moving in the vertical direction relative to frame 18, and unlocked during other modes of operations to allow beam 28 and bowl 14 to float in the vertical direction relative to frame 18.

During operation of machine 10, actuation of cushion hitch 36 may generate or allow rotational movements of tractor 12 (e.g., of frame 18) about front axle assembly 20. For example, when cushion actuator 34 extends, tractor 12 may be caused to pitch forward about front axle assembly 20. In contrast, as cushion actuator 34 retracts, tractor 12 may be caused to pitch rearward about front axle assembly 20. Likewise, when cushion actuator 34 is in a float mode of operation, tractor 12 may be free to pitch forward or rearward during interaction with uneven terrain in ground surface 16.

Operator station 26 may include one or more interface devices 38 located proximal an operator seat and configured to generate control signals and/or present displays associated with operation of machine 10. In one example, interface device 38 is used to display information regarding operation of machine 10, for example rotational and/or travel speed information, as will be described in more detail below.

Figure 2:
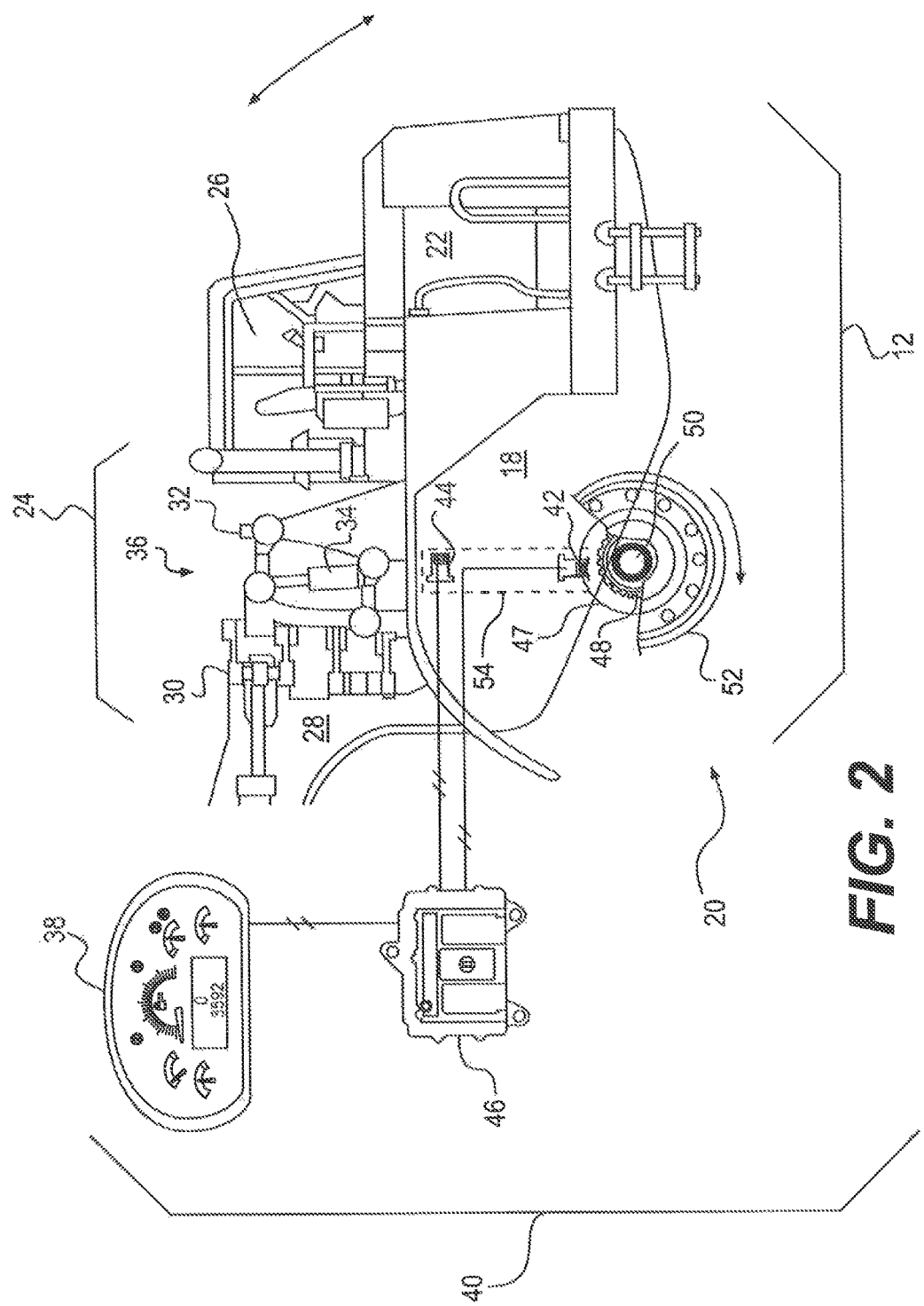
FIG. 2 is a diagrammatic illustration of an exemplary disclosed speed measurement system that may be used with the machine of FIG. 1.

As shown in FIG. 2, a speed measurement system ("system") 40 may be associated with front axle assembly 20 of tractor 12. System 40 may include, among other things, interface device 38, a first sensor 42, a second sensor 44, and a controller 46 in communication with interface device 38, sensor 42, and sensor 44. As will be explained in more detail below, controller 46 may be configured to determine a pitch-adjusted speed of front axle assembly 20 relative to an offboard reference based on signals from sensors 42 and 44, and to cause the speed to be displayed on interface device 38.

Interface device 38 may be located inside operator station 26 and configured to actively and responsively display, information (e.g., the measured rotational speed of front axle assembly 20, the measured pitch rate of frame 18, the pitch-adjusted rotational speed of front axle assembly 20, and/or the travel speed of machine 10) that has been received from and/or processed by controller 46. In some instances, interface device 38 may also be able to receive input from the operator regarding a particular display option and/or mode of operation. For example, the operator of machine 10 may be able to select whether the measured rotational speed, adjusted rotational speed, and/or travel speed is displayed. Interface device 38 may embody any type of display device known in the art, for example a monitor (e.g., a liquid crystal display (LCD), a cathode ray tube (CRT), a plasma display, or a touch-screen) or another type of device.

Sensor 42 may embody a conventional rotational speed detector having a stationary element rigidly connected to frame 18 that is configured to sense a relative rotational movement of front axle assembly 20 (e.g., a portion of a rotating shaft 50 operatively connected to a wheel, a gear, a cam, a wheel hub 52, a final drive, etc,). In the depicted example, the stationary element is a magnetic or optical element mounted to an axle housing 47 (e.g., to an internal surface of housing 47) and configured to detect the rotation of an indexing element 48 (e.g., a toothed tone wheel, an imbedded magnet, a calibration stripe, teeth of a timing gear, a cam lobe, etc.) connected to rotate with front axle assembly 20. In this example, indexing element 48 could be connected to, imbedded within, or otherwise form a portion of front axle assembly 20 (e.g., shaft 50, the wheel, the gear, the cam, hub 52, the final drive, etc.) that is driven to rotate by power source 22 (referring to FIG. 1). Sensor 42 may be located adjacent indexing element 48 and configured to generate a signal each time indexing element 48 (or a portion thereof, e.g., a tooth) passes near the stationary element. This signal may be directed to controller 46, and controller 46 may use this signal (e.g., a frequency of signal receipt) to determine the rotational speed of front axle assembly 20 relative to the stationary element of sensor 42 (e.g., relative to axle housing 47 on which the stationary element is mounted).

Sensor 44 may embody a conventional acceleration detector rigidly connected to frame 18 in an orientation that allows sensing of machine pitch rate about a rotational axis of front axle assembly 20. In the depicted example, sensor 44 is a rotational rate gyro located within a sensor housing 54 that is common to sensor 42. In other embodiments, however, sensors 42 and 44 could alternatively be housed separately, and/or the functionality of sensor 44 could be performed by an internal module of controller 46, if desired. Signals generated by sensor 44 may be directed to controller 46, and controller 46 may use these signals to determine a pitch rate (i.e., a rate of rotation) of machine frame 18 relative to ground surface 16 about front axle assembly 20.

Controller 46 may include any components or combination of components for monitoring, recording, storing, indexing, processing, conditioning, and/or communicating operational aspects of machine 10 described above. These components may include, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM.

INDUSTRIAL APPLICABILITY

The disclosed speed measurement system may be applicable to any type of machine where accurate measurement of a rotational speed is beneficial. Although the disclosed system may be used to accurately detect the speed of any rotating component relative to an associated housing, the disclosed system may be particularly applicable to mobile machines that experience pitching of the housing itself. The disclosed system may account for machine pitching, thereby enhancing the accuracy of the rotational speed measurement. Operation of system 40 will now be described in detail with respect to FIG. 2.

During operation of machine 10, sensor 42 may continuously generate signals indicative of the rotational velocity of indexing element 48 with respect to frame 18 and/or housing 47. These signals may correspond with the rotational speed of shaft 50, wheel hub 52, and/or traction devices connected to wheel hub 52. These signals may be received, processed, and/or interpreted by controller 46.

At this same time, sensor 44 may continuously generate signals indicative of the pitch rate of tractor 12. In particular, the signals generated by sensor 44 may be indicative of a rate of pitching of frame 18, axle housing 47, or another stationary housing that supports front axle assembly 20. These signals may be received, processed, and/or interpreted by controller 46.

Controller 46 may determine the rotational speed of front axle assembly 20 relative to an offboard reference (e.g., relative to ground surface 16—see FIG. 1) based on the rotational velocity and the accelerations. In particular, the rate of pitching of tractor 12 detected by sensor 44 may be added to or subtracted from the rotational velocity detected by sensor 42. For example, if the signals generated by sensor 42 indicate a rotational velocity of 50 rpm and the signals generated by sensor 44 indicate a forward pitching rate of 2 rpm, the resulting rotational speed of shaft 50 may be calculated to be 52 rpm (i.e., 50 rpm+2 rpm=52 rpm). That is, because tractor 12 (as well as the stationary portion of sensor 42) is pitching forward in this example, relative to ground surface 16, the stationary portion of sensor 42 may not detect the full and true rotational speed of front axle assembly 20 relative to ground surface 16. However, controller 46 may account for this pitching by summing the detected rotational velocity and detected pitch rate to determine the true rotational speed of front axle assembly 20 with respect to ground surface 16. Returning to the specific example above, if the pitching of tractor 12 had been in a rearward direction instead of the forward direction, the detected pitch rate of tractor 12 would have been subtracted from the rotational velocity of shaft 50.

It should be noted that the rotational speed calculated by controller 46 as a function of the detected rotational velocity and the detected pitch rate may not be the same as the travel speed of machine 10. In particular, there may be other factors involved that could cause the rotational speed to be slower than or faster than the travel speed of machine 10. For example, wheel slip or skidding could be factors that make the rotational speed and travel speed different. The disclosed system and method may be utilized to determine a true speed of a rotating component with respect to a stationary offboard reference (e.g., ground surface 16), regardless of the travel speed of machine 10.

It will be apparent to those skilled in the art that various modifications and variations can be made to the disclosed system. Other embodiments will be apparent to those skilled in the art from consideration of the specification and practice of the disclosed system. For example, although the disclosed speed measurement system was described in detail with respect to a scraper application, it is contemplated that the system may similarly be used in other land based and non land based applications (e.g., in marine vessel applications to determine an accurate rotational velocity of a propeller shaft). It is intended that the specification and examples be considered as exemplary only, with a true scope being indicated by the following claims and their equivalents.

What is claimed is:

1. A speed measurement system for a machine having a component rotationally mounted within a housing, the speed measurement system comprising:
   a first sensing element configured to be mounted to the housing adjacent the component and to generate a first signal indicative of a rotational velocity of the component,
      wherein the first sensing element includes a magnetic element, and
      wherein the magnetic element is configured to interact with a wheel attached to the component;
   a second sensing element configured to be mounted to the housing and to generate a second signal indicative of a rotational rate of the housing; and
   a controller in communication with the first sensing element and the second sensing element, the controller being configured to determine a rotational speed of the component relative to an offboard reference based on the first signal and the second signal.

2. The speed measurement system of claim 1, wherein the rotational rate includes at least one of pitching or rolling around a rotational axis of the component.

3. The speed measurement system of claim 1, wherein:
   the machine has at least one wheel supporting a tractor;
   the component is a shaft operatively connected to the at least one wheel;
   the housing includes an axle housing that at least partially encloses the shaft; and
   the first sensing element is mounted to the axle housing.

4. The speed measurement system of claim 3, wherein:
   the housing further includes a machine frame supported by the axle housing; and
   the second sensing element is mounted to the machine frame.

5. The speed measurement system of claim 1, wherein the offboard reference is a ground surface under the machine.

6. The speed measurement system of claim 1, wherein the first sensing element and the second sensing element are disposed within a common sensor housing.

7. The speed measurement system of claim 1, wherein the second sensing element is a rotational rate gyro.

8. The speed measurement system of claim 1, wherein the first sensing element includes an optical element.

9. A method of determining a rotational speed of a component rotationally mounted in a housing of a machine, the method comprising:
   sensing, using a first sensing element, a rotational velocity of the component relative to the housing,
      wherein the first sensing element includes a magnetic element, and
      wherein the magnetic element is configured to interact with a wheel attached to the component;
   sensing, using a second sensing element, a rotational rate of the housing; and
   determining the rotational speed of the component relative to an offboard reference based on the rotational velocity and the rotational rate.

10. The method of claim 9, wherein sensing the rotational rate includes sensing pitching around an axis of the component.

11. The method of claim 9, wherein:
   the machine is a wheeled-tractor-scraper having at least one wheel supporting a tractor;
   the component is a shaft operatively connected to the at least one wheel;
   the housing includes an axle housing that at least partially encloses the shaft; and
   sensing the rotational velocity includes sensing the rotational velocity from a location on the axle housing.

12. The method of claim 11, wherein:
   the housing further includes a machine frame supported by the axle housing; and
   sensing the rotational rate includes sensing the rotational rate from a location on the machine frame.

13. The method of claim 11, wherein sensing the rotational velocity from the location on the axle housing includes sensing a rotation of an indexing element inside the axle housing.

14. The method of claim 9, wherein the offboard reference is a ground surface under the machine.

15. The method of claim 9, wherein the first sensing element is configured to be mounted to the housing adjacent the component, and
   wherein the second sensing element is configured to be mounted to the housing.

16. A machine comprising:
   a bowl;
   a cushion hitch connected at a trailing end to the bowl;
   a tractor connected to the cushion hitch at a leading end and including:
      a frame;
      a shaft;
      a wheel operatively connected to the shaft; and
      an axle housing supporting the frame and at least partially enclosing the shaft;
   a speed sensor mounted inside the axle housing and configured to generate a velocity signal indicative of a rotational velocity of the shaft,
      wherein the speed sensor includes a magnetic element, and
      wherein the magnetic element is configured to interact with a wheel operatively connected to the shaft;
   a rotational rate gyro mounted to the frame and configured to generate a pitch rate signal indicative of a pitch rate of the tractor about the shaft; and
   a controller in communication with the speed sensor and the rotational rate gyro, the controller being configured to determine a rotational speed of the wheel relative to a ground surface below the machine based on the velocity signal and the pitch rate signal.

17. The machine of claim 16, wherein the speed sensor includes an optical element.

18. The machine of claim 16, wherein the rotational rate includes at least one of pitching or rolling around a rotational axis of the component.

* * * * *